(12) United States Patent
Schmidt

(10) Patent No.: US 10,604,403 B2
(45) Date of Patent: Mar. 31, 2020

(54) METHOD AND APPARATUS FOR MULTI-LINE FUEL DELIVERY

(71) Applicant: Gravity Fuel Systems, LLC, Lafayette, LA (US)

(72) Inventor: Brennan Schmidt, Weatherford, OK (US)

(*) Notice: Subject to any disclaimer, the term of this patent is extended or adjusted under 35 U.S.C. 154(b) by 305 days.

(21) Appl. No.: 15/471,853

(22) Filed: Mar. 28, 2017

(65) Prior Publication Data

US 2017/0275149 A1 Sep. 28, 2017

Related U.S. Application Data

(60) Provisional application No. 62/313,866, filed on Mar. 28, 2016, provisional application No. 62/340,093, filed on May 23, 2016, provisional application No. 62/406,541, filed on Oct. 11, 2016.

(51) Int. Cl.
| | |
|---|---|
| *B67D 7/36* | (2010.01) |
| *B67D 7/04* | (2010.01) |
| *B67D 7/78* | (2010.01) |
| *B67D 7/84* | (2010.01) |
| *F16K 31/26* | (2006.01) |
| *E21B 43/26* | (2006.01) |

(52) U.S. Cl.
CPC ............. *B67D 7/365* (2013.01); *B67D 7/04* (2013.01); *B67D 7/78* (2013.01); *B67D 7/845* (2013.01); *F16K 31/265* (2013.01); *E21B 43/26* (2013.01)

(58) Field of Classification Search
CPC . B67D 7/04; B67D 7/46; B67D 7/845; B67D 7/40; B67D 3/0083; B67D 7/365; B60K 2015/03289; Y10T 137/691; F16K 31/365
See application file for complete search history.

(56) References Cited

U.S. PATENT DOCUMENTS

| | | | |
|---|---|---|---|
| 6,619,341 B2* | 9/2003 | Cushing | B65D 25/42 141/198 |
| 9,371,830 B2 | 6/2016 | Moffitt, Jr. | |
| 9,371,831 B2 | 6/2016 | Moffitt, Jr. | |
| 9,751,749 B1 | 9/2017 | Moffitt, Jr. | |
| 9,856,131 B1 | 1/2018 | Moffitt, Jr. | |

(Continued)

OTHER PUBLICATIONS

International Search Report and Written Opinion for International Application No. PCT/US2019/033089 dated Jul. 25, 2019; pp. 1-14.

*Primary Examiner* — Timothy P. Kelly
(74) *Attorney, Agent, or Firm* — Bracewell LLP; Constance G. Rhebergen; Brian H. Tompkins

(57) ABSTRACT

A gravity-fed fuel delivery system is provided. A central storage tank holds fuel to re-supply a number of pump trucks or other mechanized equipment, such as on a hydraulic fracturing location, and can be selectively raised or lowered. Hoses or other conduits extend from the central storage tank to individual fuel tanks of the equipment to be refueled. Adapters allow connection of the distal end of each hose or conduit to an inlet opening of a fuel tank. A float valve assembly senses when fuel inside an individual fuel tank is below a predetermined level, thereby mechanically opening a valve assembly to permit fluid to flow from the central storage tank, through a conduit, through the float valve assembly and into the fuel tank.

14 Claims, 8 Drawing Sheets

(56) References Cited

U.S. PATENT DOCUMENTS

| | | |
|---|---|---|
| 10,017,374 B1 | 7/2018 | Moffitt, Jr. |
| 10,106,396 B1 | 10/2018 | Moffitt, Jr. |
| 2006/0124807 A1* | 6/2006 | Nice ................. B67D 7/845 248/140 |
| 2011/0197988 A1* | 8/2011 | Van Vliet ............ B67D 7/04 141/1 |
| 2011/0220243 A1* | 9/2011 | Szabo ............. A01C 23/045 141/266 |
| 2017/0275149 A1 | 9/2017 | Schmidt |

* cited by examiner

METHOD AND APPARATUS FOR MULTI-LINE FUEL DELIVERY

CROSS REFERENCES TO RELATED APPLICATIONS

PRIORITY OF U.S. PROVISIONAL PATENT APPLICATION Ser. No. 62/313,866, FILED Mar. 28, 2016, U.S. PROVISIONAL PATENT APPLICATION Ser. No. 62/340, 093, FILED May 23, 2016, AND U.S. PROVISIONAL PATENT APPLICATION Ser. No. 62/406,541, FILED Oct. 11, 2016, INCORPORATED HEREIN BY REFERENCE, IS HEREBY CLAIMED.

STATEMENTS AS TO THE RIGHTS TO THE INVENTION MADE UNDER FEDERALLY SPONSORED RESEARCH AND DEVELOPMENT

None

BACKGROUND OF THE INVENTION

Field of the Invention

The present invention pertains to a fuel delivery assembly for delivering fuel in a controlled manner to equipment, including, but not limited to, hydraulic fracturing pumps and related equipment in the oil and gas industry. More particularly, the present invention pertains to a fuel delivery assembly for providing a gravity-fed fuel supply to hydraulic fracturing equipment in the oil and gas industry.

Brief Description of the Prior Art

Geological formations may contain deposits of oil and/or natural gas. However, in many cases such geologic formations have low permeability; due to such low permeability, hydrocarbon deposits may not flow from said geological formations at a desired flow rate. As a result, hydraulic fracturing ("fracking") is frequently employed to artificially produce fractures in such geological formations to stimulate the flow of natural gas or oil to wellbores penetrating the formations, thereby increasing the volumes of hydrocarbons that can be recovered.

Generally, the fracking process occurs after a well has been drilled to a desired depth and a steel casing has been installed into a wellbore. Such casing is perforated within a target formation (typically, but not always, a low permeability shale formation) that contains oil or gas. Fracturing fluid is injected into a well at high pressure and flows through the perforations and into the surrounding formation; in many case, the fracturing fluid typically comprises water, proppant, and a number of chemical additives that open and enlarge fractures within the rock formation.

Fracturing fluid is pumped into a wellbore at a rate that is sufficient to increase pressure at the target depth (which is generally determined by the location of the well casing perforations), and eventually, the target formation will not be able to absorb the fluid as quickly as it is being injected. At this point, the pressure created exceeds that of the fracture gradient (pressure gradient) of the rock and causes the formation to crack or fracture. Once the fractures have been created, injection ceases and the fracturing fluids begin to flow back to the surface. Materials that are generally called proppants (i.e., sand, ceramic pellets, or any other small incompressible particles), which were injected as part of the fracturing fluid mixture, remain in the target formation to hold open the newly created fractures.

Hydraulic fracturing equipment used during fracturing operations typically comprises a slurry blender, at least one high-pressure, high-volume fracturing pump, and a monitoring unit. Additionally, a variety of associated equipment is typically used in fracking operations, including, but not limited to, at least one storage unit and a plurality of hoses and gauges that can operate over a range of pressures and injection rates. Much of this equipment is powered by gas or diesel powered engines.

In many cases, fuel is manually delivered to each of these engines. In other cases, fuel systems utilize one or more fuel pumps to deliver fuel to multiple equipment fuel tanks. Such conventional fuel systems typically comprise sensors, networks, touch screens, powered valves, switches, regulators, or other similar devices, in order to keep fuel tanks relatively full of fuel. Such conventional systems can be very complex and have a large number of potential failure points; in some cases, such fueling system include electronic sensors to electronically monitor fuel levels in each tank and remotely open and close valves in order to control fuel flow.

Fuel pump systems that employ electronic sensors typically require individual fuel lines from a main fueling unit to each individual fuel pump, and from each individual fuel pump to an equipment fuel tank, thereby resulting in significantly more hoses or conduits disposed across a location. Such additional hoses typically results in more potential failure points, more cost, and more labor expense.

With manual refueling systems, personnel must remember to regularly refuel all equipment fuel tanks on location. Should such personnel neglect or fail to refill any tank, one or more pumps or other critical pieces of equipment (such as, for example, a sand belt or blender) may run out of fuel. This can result in cutting stages of a fracking operation short or even causing severe damage to a well.

Thus, there is a need for a fuel delivery system that is safer, more reliable and less expensive to operate and maintain than conventional refueling systems.

SUMMARY OF THE INVENTION

The present invention comprises a gravity-fed system for use in controlling fuel flow to fracking equipment by way of controlling air flow, or venting, with or without a float valve mechanism. Broadly, the fuel delivery assembly comprises a gravity supply unit, which can beneficially comprise an all-inclusive package that is able to fuel one complete fleet of fracking pump trucks as well as other ancillary equipment. Additionally, the gravity supply unit is beneficially equipped with a hydraulic power pack that can selectively raise and lower said bulk fuel storage tank and operate a plurality of stabilizing legs. Raising said bulk fuel storage tank to a desired elevation on a fracking location provides a sufficient gravity head to deliver fluid (typically fuel) from said bulk fuel to individual trucks and/or other equipment on a location.

In addition, the gravity supply unit comprises a plurality of supply boxes in order to contain all necessary fixtures and float valve assemblies for an entire fracking operation. Said gravity supply unit can also be equipped with a compressor, or a nitrogen tank(s) with a regulator to control pressure.

In a preferred embodiment, said gravity supply unit can be selectively raised to an elevation that is higher than a highest equipment fuel tank on location. The bulk tank can then feed a network of conduits, hoses or supply lines. All of the connections comprise a dry break, or a no-drip connection, in order to prevent any spills.

Additionally, by way of illustration, but not limitation, the fuel delivery assembly of the present invention utilizes a unique float valve assembly that is small enough to fit through a tank neck of a fuel tank. Said float valve assembly is mechanically operated and requires no fluid pressure to actuate and turn fuel flow on and off, thereby allowing said float valve assembly to operate in very low pressure environments. Further, said float valve not only turns on and off, but can also achieve equilibrium between fuel flow and fluid burn rate, thus keeping and maintaining a relatively steady flow of fuel instead of repetitive opening and closing.

The fuel delivery assembly of the present invention uses only the force of gravity to supply fuel from a bulk storage tank to separate fuel tanks of pumps, trucks and other equipment on a fracking location. As such, there is no risk of over pressuring fuel lines if a pump's internal or external pressure regulator fails. The fuel delivery assembly of the present invention does not require any wires, electronics, or computers to keep fuel tanks full. Further, the fuel delivery assembly of the present invention can fuel a plurality of different fuel tanks from one main supply tank with smaller feeder lines; such feeder lines run a relatively short distance from said supply tank to the tanks that are to be refueled.

An adaptor assembly of the present invention can easily adapt to any fuel tank neck size. As such, there is no need for specialized connection to existing fuel lines or systems. By contrast, conventional float systems include a swinging arm which cannot fit through standard fuel tank necks. Additionally, there is a risk that conventional floats may contact obstacles in a fuel tank which would cause a valve to fail to actuate as desired, potentially causing safety and environmental issues.

Because the gravity-fed fuel delivery system of the present invention runs a loop for a main fuel line instead of individual hoses to each unit, said gravity system can flush said loop. An individual can then disconnect the dry break connections from said unit in order to eliminate a potential fire from following hoses with fuel in them back to the bulk tank. Additionally, after rig up, the fuel delivery assembly of the present invention can be easily monitored by relatively few personnel which can result in a significant cost savings.

BRIEF DESCRIPTION OF THE DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
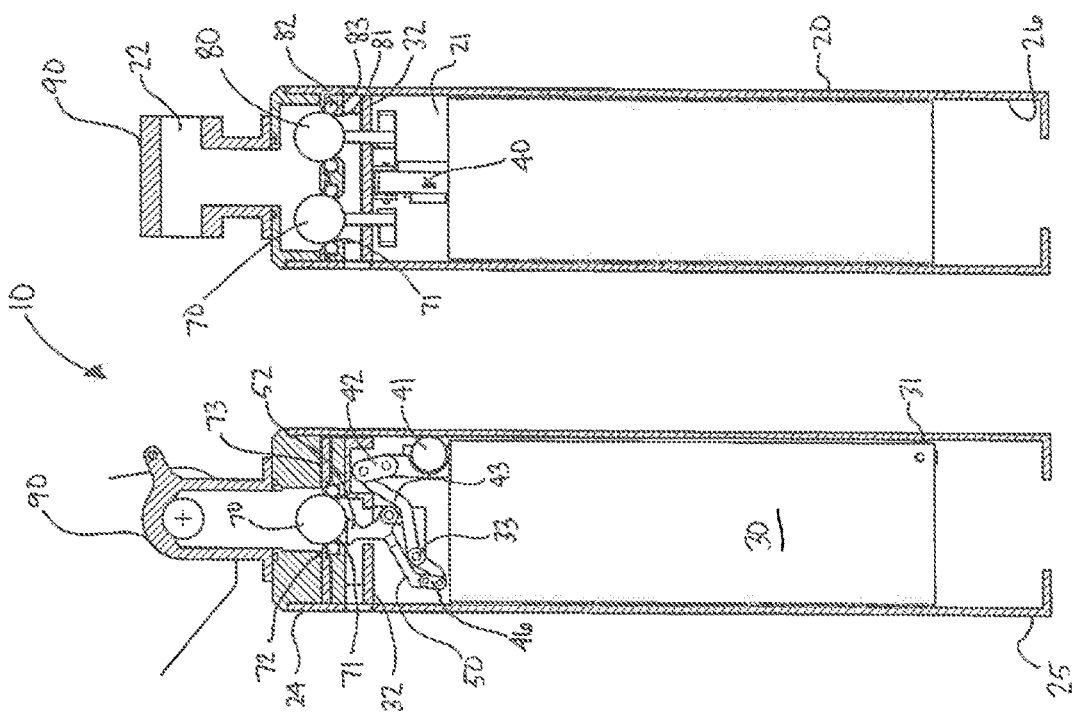
FIG. 1A depicts a side sectional view of a float valve assembly of the present invention in a closed configuration.
FIG. 1B depicts a side sectional view of a float valve assembly of the present invention rotated approximately ninety degrees from the view depicted in FIG. 1A.
FIG. 1C depicts a side sectional view of a float valve assembly of the present invention in an open configuration.
FIG. 1D depicts a side sectional view of a float valve of the present invention rotated approximately ninety degrees from the view depicted in FIG. 1C.

The present invention comprises a fluid delivery assembly with or without a float valve mechanism for distributing fuel or other fluid in a safe and controlled manner to fuel tanks of one or more pump trucks or other equipment powered using internal combustion engines. For example, in a preferred embodiment, the fluid delivery assembly of the present invention can be used to deliver liquid fuel from a bulk storage tank to the individual fuel tanks of multiple trucks, high-pressure pumps and/or other powered equipment—sometimes referred to as a "spread"—situated on a location where fracking operations are performed.

In a preferred embodiment, the fuel delivery assembly of the present invention generally comprises a central bulk fluid tank (such as a bulk storage tank or container), ideally having sufficient capacity to store and supply fuel to at least one complete pump truck fleet used to conduct a conventional fracking operation. Additionally, said fluid delivery assembly further comprises a hydraulic power pack capable of selectively raising and lowering said central bulk fluid tank, and also engaging a plurality of stabilizing legs for supporting said bulk fluid tank in an elevated position. Said bulk fluid tank further comprises a plurality of supply boxes for storing fixtures and float valve assemblies typically required for conventional fracking operations. Said bulk fluid tank can also be equipped with an air compressor, and/or a nitrogen tank(s), each with a regulator to control pressure.

In a preferred embodiment, distribution or flow of fuel from said bulk fluid tank is powered by gravity. Said bulk fluid tank can be selectively raised to a higher elevation than the highest equipment fuel tank on a fracking location using at least one fluid-powered (typically hydraulic) cylinder. A plurality of conduits extend from said bulk fluid tank to multiple equipment fuel tanks to be supplied with fuel. All connections comprise a "dry break", or a no-drip connection, in order to prevent any spills in the event of inadvertent disconnection of any such conduit from said bulk fluid tank or any intermediate conduits.

Additionally, the fuel delivery assembly of the present invention further comprises a float valve assembly operationally attached to the distal end or outlet of a distribution conduit. In a preferred embodiment, at least one float valve assembly is disposed within a fuel tank of a truck, pump or other equipment that is supplied with fuel by the present invention and controls the flow of fluid (typically fuel) from said conduit to said tank. Although dimensions can be adjusted to fit particular applications, in a preferred embodiment said float valve assemblies are sized to fit through a conventional schedule 40 pipe fuel tank neck. A mounting adapter assembly allows each float valve assembly to be suspended within an inner chamber of a fuel tank.

Referring to the drawings, FIG. 1A depicts a side sectional view of a float valve assembly 10 of the present invention in a closed configuration, while FIG. 1B depicts a side sectional view of said float valve assembly 10 rotated approximately ninety degrees from the view depicted in FIG. 1A. FIG. 1C depicts a side sectional view of float valve assembly 10 of the present invention in an open configuration, while FIG. 1D depicts a side sectional view of said float valve assembly 10 of the present invention rotated approximately ninety degrees from the view depicted in FIG. 1C.

In a preferred embodiment, float valve assembly 10 comprises an outer sleeve or cage 20 having top 24, bottom 25 and defining an inner chamber 21 and having at least a lower opening or aperture 23 extending into said inner chamber 21. Fluid inlet pathway 22 leads into a ball and seat, and when the ball opens, the fluid hits a deflector plate flowing horizontally away from the valve into the fuel tank, keeping fluid from spraying hard directly on top of the float member 30. Only substantially small amounts of fluid go down into inner chamber 21, which helps with lubrication. A substantially buoyant float member 30 is slidably disposed within said inner chamber 21; said float member 30 can travel in a path that is substantially parallel to the longitudinal axis of cage 20 (which, in most operational settings, is substantially vertical).

Linkage assembly 40 operationally extends between said float member 30 to a valve assembly, in this case a ball and seat-type valve assembly described in detail herein. Although different configurations can be employed without departing from the scope of the present invention, in a preferred embodiment said linkage assembly 40 comprises a float arm and a plurality of rollers 31 and 41 operationally attached to said float member 30. Said float, or linkage, rollers 31 and 41 are movably disposed against inner surface 26 of cage 20; in a preferred embodiment, said linkage rollers 31 and 41 can be disposed within an elongate groove or slot (not shown in FIGS. 1A-1D) disposed on said inner surface 26 of cage 20.

Float arm and roller 41 is pivotally attached to first linkage arm 43 by first dual hinge link 42. First linkage arm 43 is attached to linkage mounting brace 47 by way of hinge pin 33 with second end of first linkage arm 43 being pivotally attached to ball lifting, or displacement, arm 50 by second dual hinge link 46; thus said second dual hinge link 46 is pivotally attached to ball lifting arm 50. Said ball lifting arm 50 is pivotally attached to linkage mounting brace 47 using hinge pin 51, and has ball lifting cam member 52 disposed at its distal end. Through this linkage, or leverage system 40, the power supplied by float member 30 is substantially multiplied, thereby making it possible to lift balls 70 and 80 off of their respective seats that would otherwise not be able to be lifted with a substantially small float weight, such as, for example, said float weight in float valve assembly 10.

In a preferred embodiment, stainless steel ball 70 is sized to engage and mate with ball seat 71. When engaged against seat 71, ball 70 compresses o-ring 72 disposed in said seat 71. The weight of the ball 70 is sufficient to create a fluid pressure seal between said ball 70 and seat 71, even with little or no pressure differential across said seat 71. As fluid pressure above ball 70 increases, ball 70 compresses o-ring 72 causing said o-ring 72 to partially extrude and engage against the outer surface of ball 70, thereby further promoting a fluid pressure seal. In a preferred embodiment, said o-ring 72 is sandwiched between two substantially parallel plate members 73 and 83 that compress said o-ring 72. Additionally, on opposing side of float valve assembly 10, as fluid pressure above ball 80 increases, ball 80 compresses o-ring 82 causing said o-ring 82 to partially extrude and engage against the outer surface of ball 80, thereby further promoting a fluid pressure seal.

In a preferred embodiment, the valve assembly of the present invention comprises at least two pairs of mating ball and seat tandems, as depicted in FIGS. 1B and 1D. Referring to FIG. 1C, lowering of said float member 30 within said inner chamber 21 (such as when fuel is below a predetermined level in a fuel tank) causes said linkage assembly 40 to extend, which in turn causes ball lifting arm 50 to protrude upward until cam member 52 contacts ball 70, applying upward force to ball 70 and lifting ball 70 off of seat 71, thereby removing a fluid pressure seal. With such fluid pressure seal removed, fluid is permitted to gravity feed past seat 71 and onto a deflector plate 32 and able to fuel said fuel tank, while a substantially small amount of fluid flows through said deflector plate 32 and into chamber 21 and, ultimately, into a surrounding fuel tank. Referring to FIG. 1 D, a similar effect occurs as lifting arm 60 also protrudes upward, causing cam member 62 to apply upward force to ball 80, lifting ball 80 off of seat 81, thereby removing a fluid pressure seal, and allowing fluid to gravity feed past seat 81 and onto deflector plate 32 and able to fuel said fuel tank, while a substantially small amount of fluid flows through deflector plate 32 and into chamber 21 (and a surrounding fuel tank).

It is to be observed that said linkage assembly 40 can be adjusted so that balls 70 and 80 remain seated (forming fluid pressure seals, thereby preventing fluid flow into said tank) when float member 30 is above a certain desired predetermined level within a fuel tank, said level corresponding to a desired fuel volume in said tank. Conversely, said balls 70 and 80 are unseated (thereby allowing fuel to flow into said tank) when float member 30 falls below said predetermined level—that is, when fuel volume in said tank falls below a desired amount.

Conversely, raising of said float member 30 within said inner chamber 21 (such as when fuel is above a predetermined level in a fuel tank) causes said linkage assembly 40 to retract as depicted in FIGS. 1A and 1B. Retraction of linkage assembly 40 in turn causes ball lifting arm 50 to recede downward away from ball 70, thereby permitting ball 70 to seat on and engage against seat 71. In this configuration, a fluid pressure seal is formed, preventing fluid from gravity feeding past ball 70 and seat 71 and onto deflector plate 32 and able to fuel said fuel tank, while a substantially small amount of fluid flows through said deflector plate 32 and into chamber 21. Referring to FIG. 1B, a similar effect occurs as lifting arm 60 also recedes downward, causing cam member 62 to move out of contact with ball 80; in this configuration, a fluid pressure seal is formed, preventing fluid from gravity feeding past ball 80 and seat 81 and onto deflector plate 32 and able to fuel said fuel tank, while a substantially small amount of fluid flows through said deflector plate 32 and into chamber 21.

In a preferred embodiment, one of said ball lifting arms is longer than the other ball lifting arm; for example, ball lifting arm 50 is longer than ball lifting arm 60. As a result, when linkage assembly 40 is extended, ball lifting arm 50 lifts ball 70 upward off its seat 71, thereby breaking a fluid pressure seal and allowing fluid to pass through said seat, before ball lifting arm 60 unsets ball 80 from seat 81. This configuration requires significantly less force to lift a smaller tandem ball than would be required to unseat a single large ball. Further, once a first ball is unseated, a fluid pressure differential is reduced across said float valve assembly 10, thereby making it easier for subsequent additional ball(s) to be unseated. After said additional ball(s) are unseated, additional flow capacity is provided, thereby permitting greater flow rate through said float valve assembly 10 and into a fuel tank.

In a preferred embodiment, said float valve assembly 10 is entirely mechanically actuated and, therefore, requires no fluid pressure or pilot supply to open or close. As a result, said float valve assembly 10 of the present invention can operate in low pressure environments (e.g., at less than 10 psig). Further, said float valve assembly 10 not only opens and closes, but also allows equilibrium between fuel flow and fuel burn rate due to the shape and angle of ball lifting arms 50 and 60, thus keeping and maintaining a relatively steady flow of fuel into a fuel tank instead of frequent opening and closing. Thus, as the float valve follows the level of fluid in the fuel tank, said float valve only opens the valve as much as needed in order to achieve the accurate amount of fuel flow, while still functioning as an on and off valve.

Additionally, the float valve assembly provides a number of operational and functional advantages including, without limitation, said float sleeve or cage to protect said float member. A plurality of float guide slots can be disposed along the inner surface of said float sleeve, together with a plurality of guide rollers on said float member that are movably disposed in said guide slots, reduce friction and keep said float member properly aligned in said float sleeve at all times. Further, a deflector plate prevents fuel or other fluid from spraying directly on top of the float member and into the inner chamber of said float sleeve.

Figure 2:
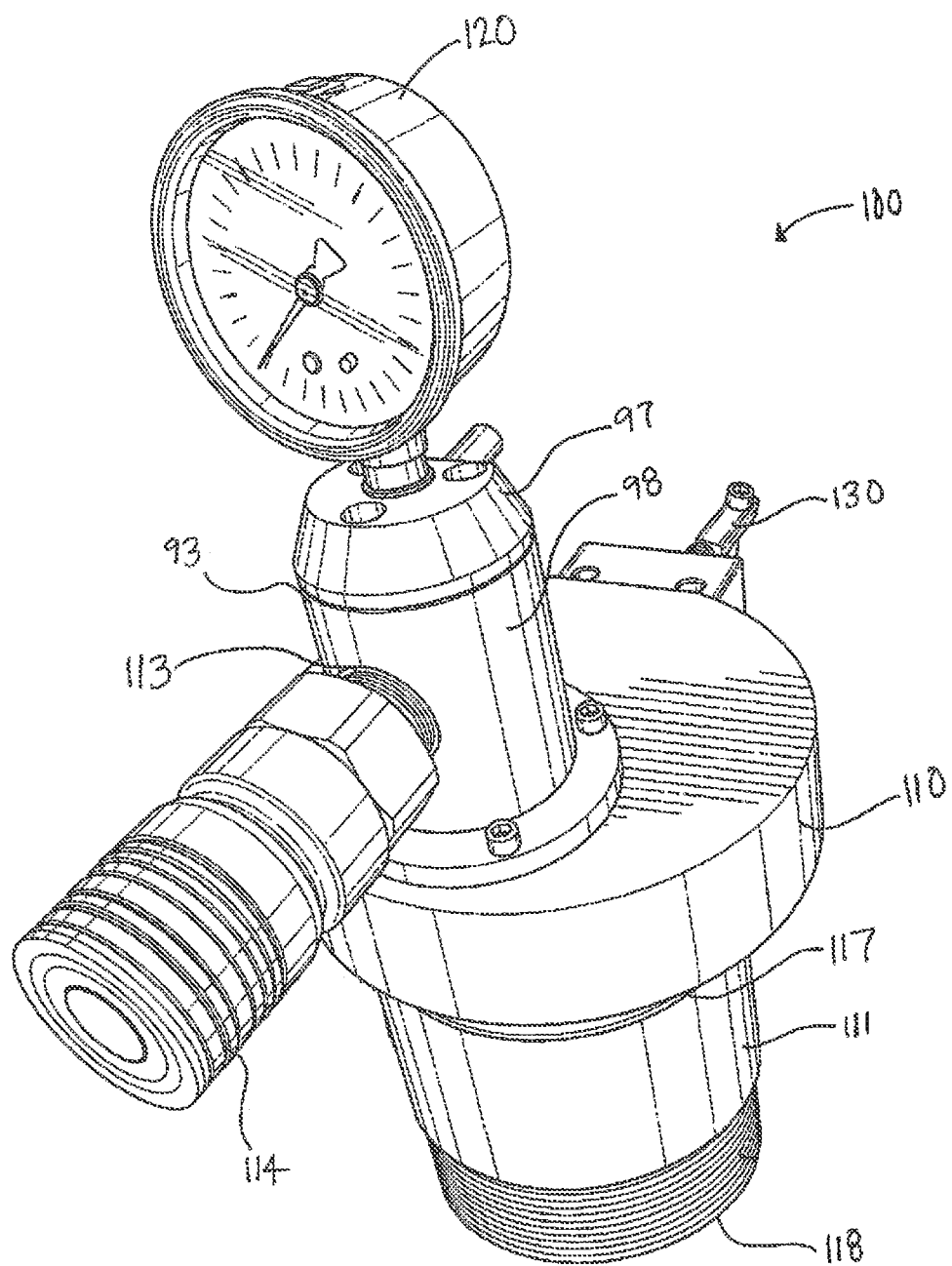
FIG. 2 depicts a perspective view of an adapting fixture of the present invention.

FIG. 2 depicts a perspective view of an adapter assembly 100 of the present invention. Float valve assembly of the present invention is operationally attached to an adapter 100 that can connect directly to a tank neck 111 of a fuel tank. Thus, only a fuel tank cap must be removed; said adapter assembly 100 can be installed in place of said fuel cap. Because of the unique design of adapter assembly 100 as described in detail herein, by way of illustration, but not limitation, the fuel delivery assembly of the present invention can easily adapt to any fuel tank neck size, such as, for example, a four inch (4") tank neck, a two inch (2") tank neck, or any other size tank neck, as necessary. As mentioned, the system eliminates the need to connect into existing fuel systems.

Adapter assembly 100, or conduit, comprises a first end and a second end, wherein said first end is in fluid communication with a bulk storage tank (described below) and said second end is attached to an inlet of a fuel tank. Adapter assembly, or conduit, 100 attachably connects to a substantially cylindrical extension member, or pipe tank neck, 111 having a top 117, a bottom 118, and defining an inner chamber. In a preferred embodiment, a cap adapter 110 operationally adapts or connects to top 117 of pipe tank neck 111, thus replacing the need for a conventional fuel cap. Cap adapter 110 comprises a substantially circular shaped member, wherein said cap adapter 110 operationally clamps into place by way of a clamp adapter 130 on fuel tank neck 111. Additionally, although not illustrated in FIG. 2, an extension member of adaptor assembly 100, or mandrel 98, can be received within inner chamber of pipe tank neck 111, thus allowing fuel to flow from and through adapter assembly 100 to float valve assembly 10, as necessary. As such, although not depicted in FIG. 2, mounting adapter assembly 100 allows float valve assembly 10 to be suspended and disposed within an inner chamber of a fuel tank.

Additionally, adapter assembly 100 comprises an inlet 113 that allows fluid (such as, for example, fuel) to enter and flow through adapter assembly 100, and ultimately, into float valve assembly 10, as necessary. Fuel inlet 113 comprises a substantially cylindrical shaped member that is attachably connected to mandrel 98. Mandrel 98 comprises a first end 92 and a second end 93, wherein first end 92 attachably connects to a side cap 95. Side cap 95 further connects to a swivel member 90 and second end 93 attachably connects to a mandrel cap 97. Mandrel cap 97 connects to a pressure gauge 120, wherein pressure gauge 120 is used to measure the internal pressure of adaptor assembly 100 and float valve assembly 10. In addition, fuel inlet 113 further comprises a quick connect 114 that attachably connects to a fuel supply line and has a dry break in order to prevent any spills in the event of inadvertent disconnection.

Figure 3:
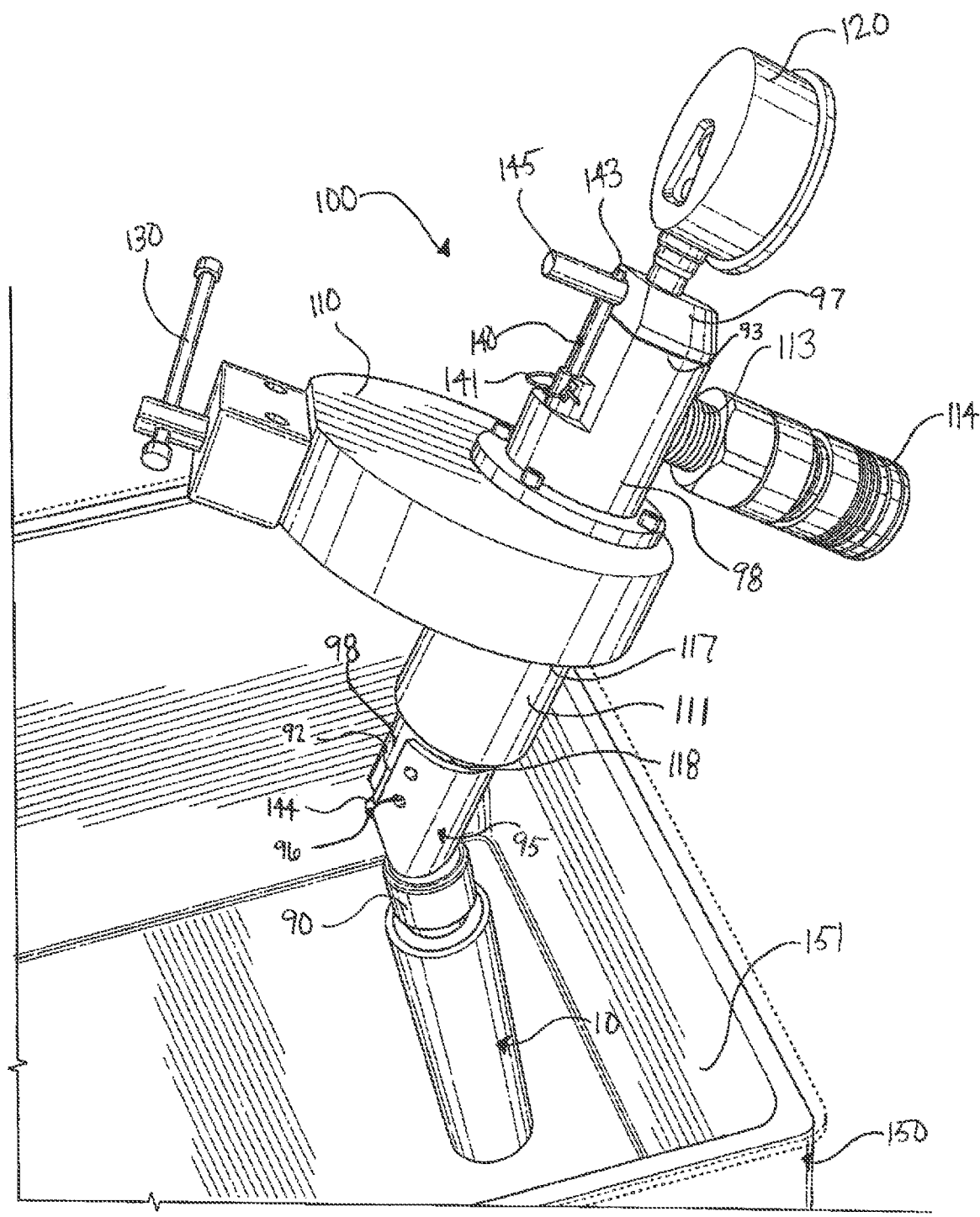
FIG. 3 depicts a perspective view of an adapting fixture of the present invention with a float valve assembly operationally attached to adapting fixture.

FIG. 3 depicts a perspective view of adapter assembly 100 of the present invention with a float valve assembly 10 operationally attached to adapter assembly 100. As depicted in FIG. 3, in an alternate embodiment, adapter assembly 100 attachably adapts and connects to tank neck 111 by way of cap adapter 110, thereby holding and securing the float valve inside fuel tank 150. Mandrel 98 comprises an inner channel to allow fuel to flow from inlet 113, through mandrel 98, through sidecaps 95, through swivel 90 (thus, through adapter assembly 100), to float valve assembly 10, whereby first end 92 of mandrel 98 attachably connects to swivel member 90 by way of side caps 95. Although not depicted in FIG. 3, swivel member 90 can connect to float valve assembly 10 by either screws or pipe threads saving vertical space inside of a fuel tank and allowing float valve assembly 10 to fit within substantially compact or "short" fuel tanks, as necessary. Swivel 90 is housed within at least one side cap 95, wherein swivel member 90 seals and pivots within side cap 95. Side cap 95 is attachably connected to first end 92 of mandrel 98 by way of a plurality of screws 96 or other fasteners that beneficially hold side cap 95 in place. As a result, mandrel 98 of adaptor assembly 100 is able to be received within fuel tank neck 111, and thus is ultimately able to adjust float valve 10 to a desired angle. Further, cap adapter 110 adapts to top 117 of tank neck 111 wherein said cap adapter 110 can be operationally clamped into place by way of a screw fastener 130, or adapter clamp, thereby replacing said fuel cap. Thus, clamp 130 beneficially allows cap adapter 110 to fit and adapt onto a variety of different size fuel tank necks, as necessary. For example, clamp 130 can be tightened in order to adapt and adjust cap adapter 110 to a substantially smaller diameter fuel tank neck, or clamp 130 can be loosened in order to adapt or adjust cap adapter 110 to a relatively substantially larger diameter fuel tank neck.

Additionally, adapter assembly 100 comprises fuel inlet 113 that allows fuel to enter and flow through adapter assembly 100, and ultimately, into float valve assembly 10, as necessary. Fuel inlet 113 comprises a substantially cylindrical shaped member that is attachably connected to second end 93 of mandrel 98. Second end 93 of mandrel 98 further connects to mandrel cap 97, wherein mandrel cap 97 connects to pressure gauge 120, thereby being able to measure the internal pressure of adaptor assembly 100 and float valve assembly 10. In addition, fuel inlet 113 further comprises a quick connect 114, having a dry break connection, that attachably connects to a fuel supply line.

Mounting adapter assembly 100 allows float valve assembly 10 to be suspended and disposed within an inner chamber 151 of a container 150, such as a fuel tank (although not depicted in FIG. 3). As such, adapter assembly 100 will allow float valve assembly 10 to enter into inner chamber 151 of fuel tank 150 in a substantially straight orientation. Then, once float valve assembly 10 is located in inner chamber 151 of tank 150, adapter assembly 100 will allow the float 10 to be locked into a substantially vertical position, by way of an adjustment rod 140 connected to swivel member 90.

As illustrated in FIG. 3, adjustment rod 140 comprises a first end 143 and a second end 144, wherein first end 143 is located adjacent to fuel inlet 113 and further comprises a handle member 145 and second end 144 is attachably connected to swivel 90 by way of a chain link connector 148, or any other similar attachment means. Thus, adjustment rod 140 beneficially runs from fuel inlet 113, although through a separate bore so not to communicate with or disrupt fuel flow (not depicted in FIG. 3), through mandrel 98 and cap adapter 110 through pipe tank neck 111 to swivel 90 of float valve assembly 10; adjustment rod 140 thus allows adapter assembly 100 to adjust swivel 90 to a desired angle, such as, for example, from approximately 0 degrees to approximately 50 degrees in increments of approximately 3.5 degrees in order to achieve a substantially vertical float valve. Once a desired angle has been achieved, locking pin 141 secures and locks adjustment rod 140 in place, thereby maintaining the position and orientation of float valve assembly 10 within inner chamber 151 of tank 150.

In a preferred embodiment, when in operation, a technician will take an adapter assembly 100 and a float valve assembly 10 to a first tank, remove the fuel cap, slide float valve assembly 10 and adapter assembly 100 into the tank neck 111, and tighten down clamp 130 on adapter assembly 100, as necessary. If the tank neck 111 is at an angle, said technician is able to hold and maneuver handle member 145 of adjustment rod 140 in order to utilize swivel member 90 of float valve assembly 10 in order to make float valve assembly 10 substantially vertical. Said technician will then use locking pin 141 to secure adjustment rod 140 in place in order for float valve assembly 10 to remain in a substantially vertical position during the fracking operation. Said technician is then able to connect an end of a fuel hose to a dry break connection 114 on a fluid inlet 113 of adapter assembly 100.

Figure 4:
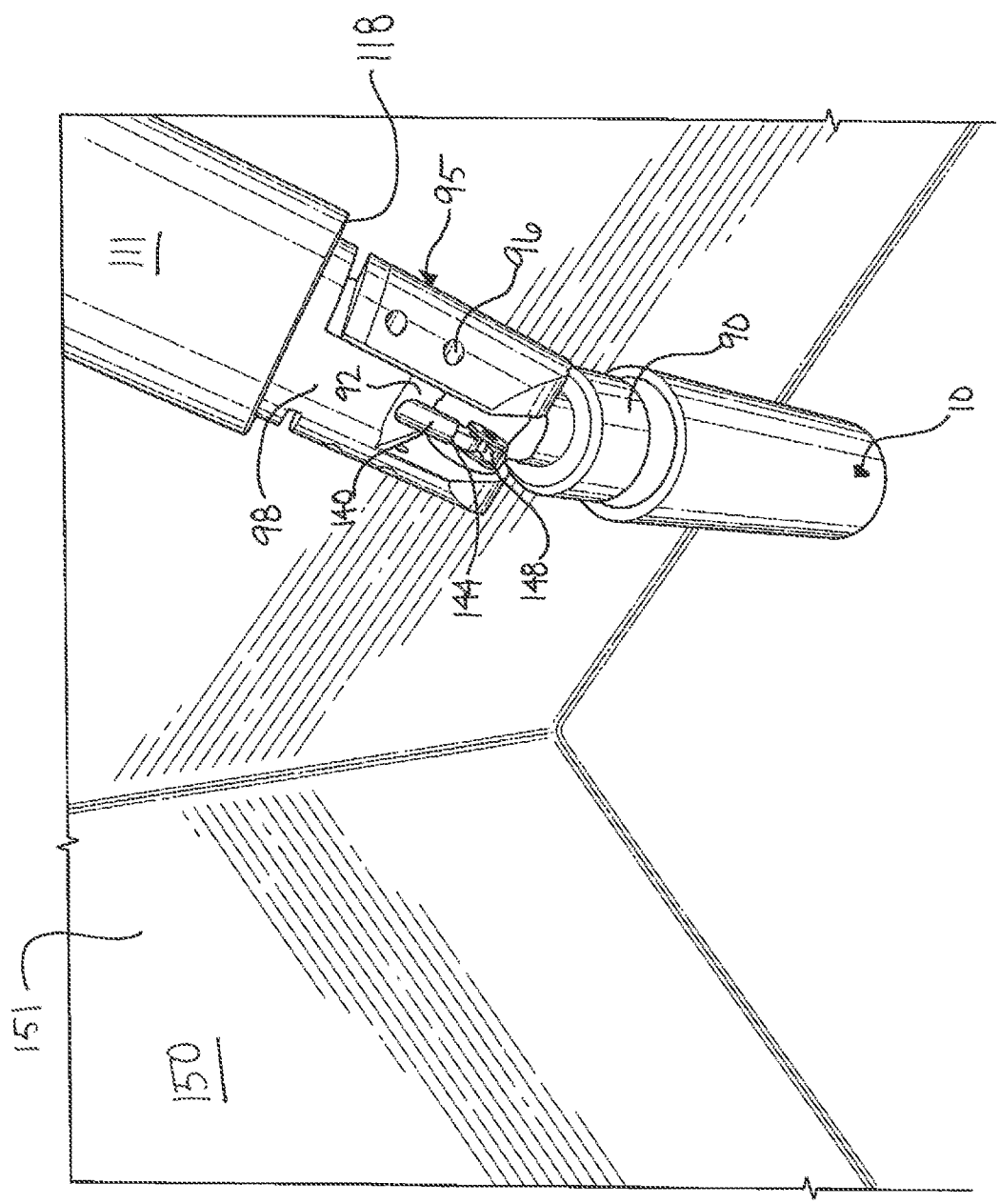
FIG. 4 depicts a perspective view of a float valve assembly of the present invention disposed in an inner chamber of a container, such as a fuel tank.

FIG. 4 depicts a perspective view of float valve assembly 10 of the present invention disposed in inner chamber 151 of container 150, such as a fuel tank. Because adapter assembly 100 of the present invention can replace an existing fuel tank cap, virtually any type of equipment can be fueled using the fuel delivery system of the present invention. As depicted in FIG. 4, swivel 90 can connect to float valve assembly 10 of the present invention by way of screws or pipe threads thus beneficially allowing float valve assembly 10 to fit within substantially compact or "short" fuel tanks, as necessary. Further, swivel 90 is housed within side cap 95, wherein swivel 90 is able to seal and pivot within side cap 95. Side cap 95 is attachably connected to first end 92 of mandrel 98 by way of screws 96 or other fasteners that hold side cap 95 in place. As a result, mandrel 98 of adaptor assembly 100 is able to be received within fuel tank neck 111, and thus is ultimately able to adjust float valve 10 to a desired angle.

Adapter assembly 100 allows float valve assembly 10 to enter into inner chamber 151 of fuel tank 150 in a substantially straight orientation. Once float valve assembly 10 is located in inner chamber 151 of tank 150, adapter assembly 100 allows float valve assembly 10 to be locked into a substantially vertical position, by way of adjustment rod 140 connected to swivel member 90, whereby second end 144 of adjustment rod 140 is attachably connected to swivel member 90 by way of chain link connector 148, or any other similar attachment means. Adjustment rod 140 beneficially runs from fuel inlet 113, although through a separate bore so not to communicate with or disrupt fuel flow, through mandrel 98, through cap adapter 110 and through pipe tank neck 111 to swivel 90 of float valve assembly 10; adjustment rod 140 thus allows adapter assembly 100 to adjust swivel 90 to a desired angle, such as, for example, from approximately 0 degrees to approximately 50 degrees in increments of approximately 3.5 degrees in order to achieve a substantially vertical float valve 10. Although not depicted in FIG. 4, once a desired angle has been achieved, locking pin 141 secures and locks adjustment rod 140 in place, thereby maintaining the position and orientation of float valve assembly 10 within inner chamber 151 of tank 150.

Figure 5:
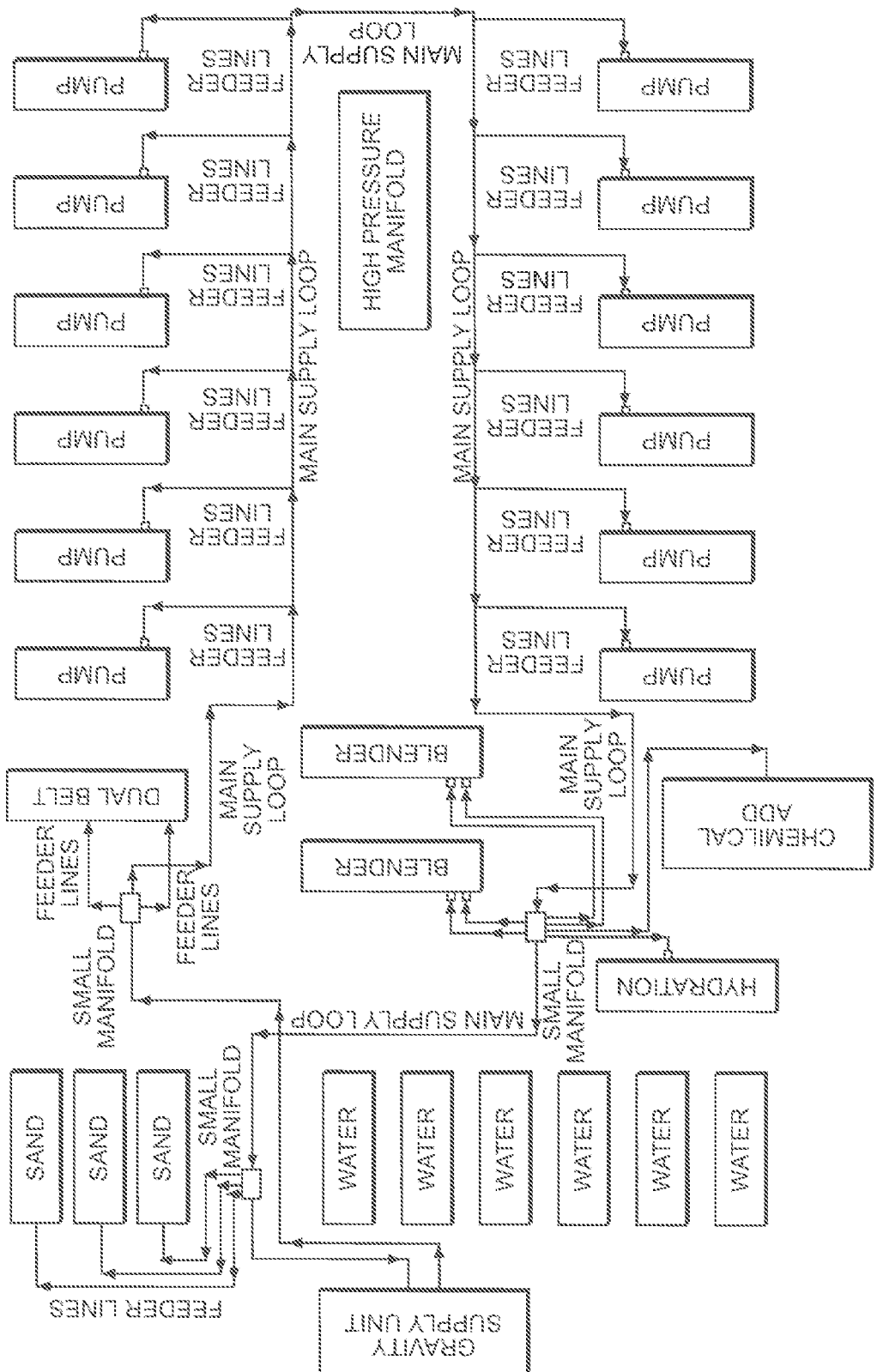
FIG. 5 depicts a schematic view of a proposed layout of a fueling system of the present invention.

FIG. 5 depicts a schematic view of a representative layout of a fuel delivery system of the present invention utilized in connection with a conventional hydraulic fracturing operation. In a preferred embodiment, the bulk fuel tank (labeled "Gravity Supply Unit") provides fuel to multiple internal combustion engines, including an array of high pressure pumps and ancillary equipment used during the fracking operation (such as, for example, blenders, hydration units, chemical addition units, etc.) As depicted in FIG. 5, a main supply loop can be formed to supply fuel to individual feeder lines which, in turn, route fuel directly to said pumps. It is to be observed that a float valve assembly of the present invention is installed within the fuel tanks of each of said internal combustion engines that are supplied fuel using the fuel delivery assembly of the present invention.

Figure 6:
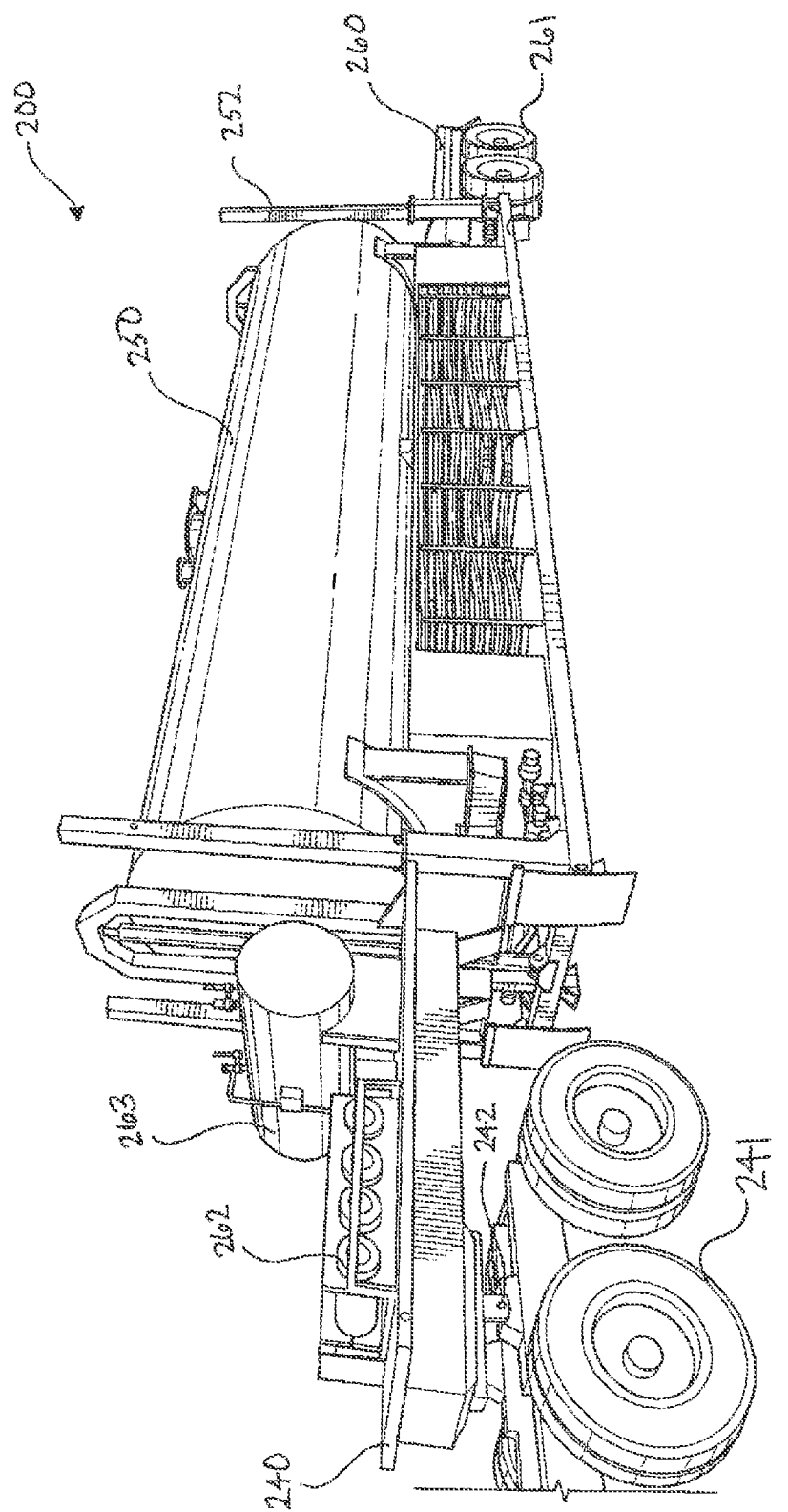
FIG. 6 depicts a side perspective view of a bulk storage tank fluid reservoir of the present invention in a collapsed configuration, such as for transport.

FIG. 6 depicts a side perspective view of a bulk storage tank assembly 200 of the present invention in a collapsed configuration, such as for transport. In a preferred embodiment, the fuel delivery assembly of the present invention generally comprises a central bulk fluid tank 250 (such as a bulk storage tank or container), ideally having sufficient capacity to store and supply fuel to at least one complete pump truck fleet and ancillary equipment used to conduct a conventional fracking operation.

Bulk storage tank assembly 200 also comprises an emergency fire flush, where a relatively low pressure tank 263 holds fluid that is powered by nitrogen or air to flush through the main supply line loop in case of a fire. Although not depicted in FIG. 6, another tank is built on the unit in order to catch the flush fluid when said flush fluid is used to flush the main supply loop. Bulk storage tank assembly 200 can also have the capability of flushing the main supply line with nitrogen or air to make the hoses easier to handle during rig up and rig down by way of decreasing the weight of fluid in said hoses.

Located directly behind a front deck 240 (or, the fifth wheel), a hydraulically raised and lowered central bulk fluid tank 250 with an external frame, also acting as a trailer frame, can connect the fifth wheel 242 to a plurality of rear trailer tires 261 when in transport mode. Central bulk fluid tank 250 can be lowered, as necessary, in order to meet any legal Department of Transportation (DOT) height restrictions. Located behind central bulk fluid tank 250 is a rear deck 260 located above a plurality of trailer tires 261. Additionally, a plurality of plumbing and valves to control, by way of illustration, but not limitation, fuel flow, air flush, and fire flush, will be located on the unit. Further, plumbing that comes from said bulk tank 250 can also be equipped with a blow down line that runs into a top of said bulk tank 250 and separates from a supply line with a valve. This allows air or nitrogen to be blown through the fuel supply loop in order to push fuel back to the main bulk tank 250.

In addition, bulk storage tank assembly 200 comprises a plurality of supply boxes in order to hold all necessary fixtures and float valve assemblies for an entire fracking operation. Bulk storage tank assembly 200 can also be equipped with a compressor or a nitrogen tank(s) 262 with a regulator to control pressure, wherein compressor or nitrogen tank(s) 262 is positioned on a front deck 240. In a preferred embodiment, a plurality of small manifolds that can be carried by hand will also be stored on the unit. These manifolds will be placed in a desired location in the main supply loop to feed blenders, hydrations, chemical adds, sand equipment, or any other desired equipment.

Figure 7:
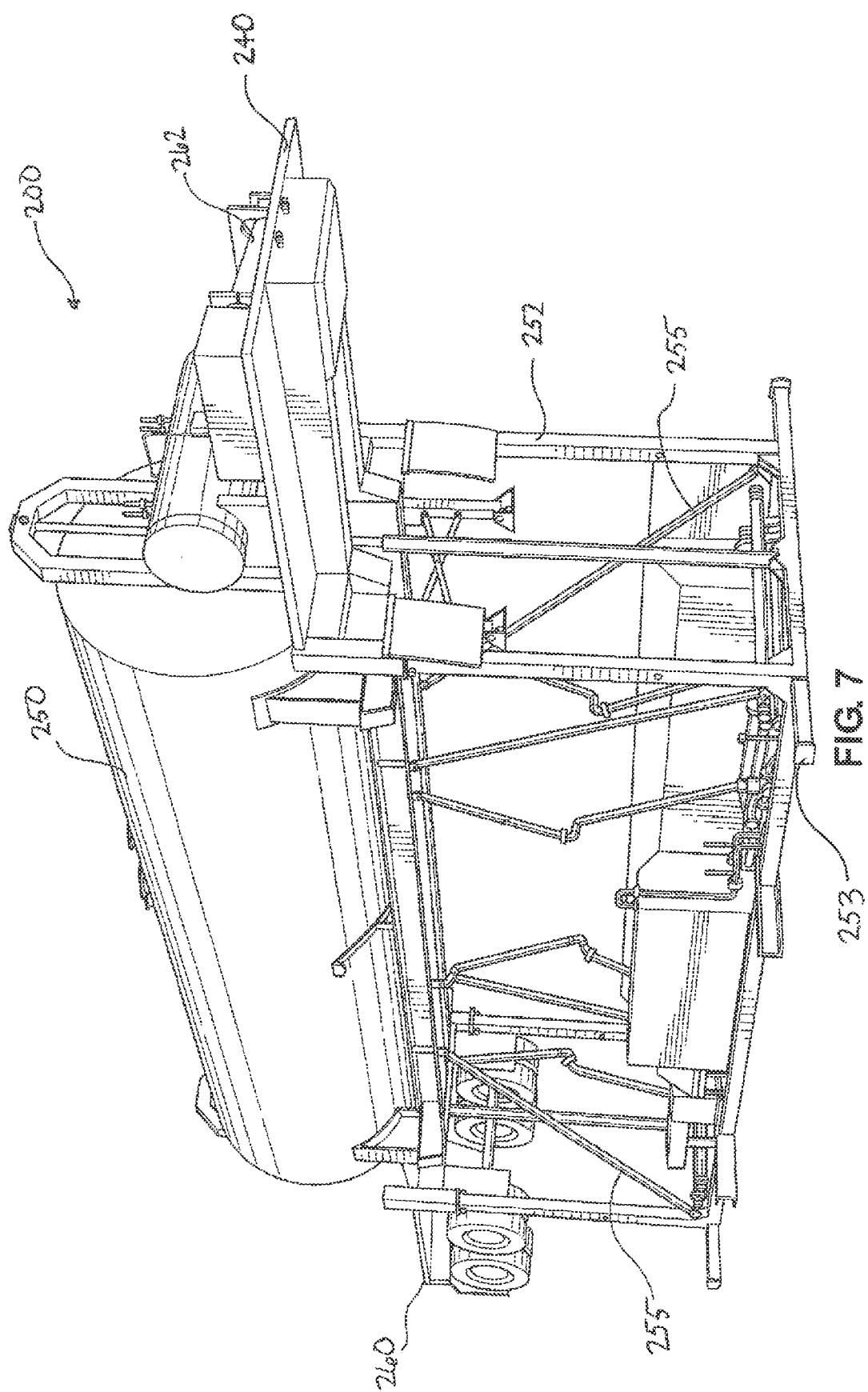
FIG. 7 depicts a side perspective view of a bulk storage tank fluid reservoir of the present invention in a raised orientation for operation.

FIG. 7 depicts a side perspective view of a bulk storage tank fluid reservoir 250 of the present invention in a raised orientation for operation. Bulk storage tank assembly 200 comprises a hydraulic power pack capable of selectively raising and lowering said central bulk fluid tank 250 along a plurality of stabilizing arms 253 and a plurality of supporting legs 252 for supporting said bulk fluid tank 250 in an elevated position. Additionally, bulk storage tank assembly 200 comprises at least one angle brace 255 that can be manually put into place in order to provide lateral stability to bulk fluid tank 250 when fluid tank 250 is raised. Said bulk fluid tank assembly 200 250-further comprises a plurality of supply boxes for storing fixtures and float valve assemblies typically required for conventional fracking operations. Said bulk fluid tank assembly 200 can also be equipped with an air compressor, and/or a nitrogen tank(s) 262, each with a regulator to control pressure, wherein compressor or nitrogen tank(s) 262 is positioned on front deck 240.

In a preferred embodiment, distribution of fuel from said bulk fluid tank 250 is powered by gravity. Raising said bulk fuel storage tank 250 to a desired elevation on a fracking location provides a sufficient gravity head to deliver fuel from said bulk fuel tank 250 to individual trucks and/or other equipment on a location. Said bulk fluid tank 250 can be selectively raised to a higher elevation than the highest equipment fuel tank on a fracking location; a plurality of conduits extend from said bulk fluid tank 250 to multiple equipment fuel tanks to be supplied with fuel. All connections comprise a "dry break", or a no-drip connection, in order to prevent any spills in the event of inadvertent disconnection of any such conduit from said bulk fluid tank 250.

Because the multi-line fuel delivery system of the present invention runs a loop for a main fuel line instead of individual conduits or hoses to each unit, said multi-line fuel delivery system can flush said loop. Dry break connections can be disconnected from said fuel delivery system in order to eliminate a potential fire from following the conduits or hoses back to the bulk tank. Additionally, the fuel delivery system of the present invention can be moved onto a location, rigged up, operated and rigged down quickly and efficiently.

The fuel delivery assembly of the present invention uses only gravitational force to supply fuel to fuel tanks of trucks and/or other equipment. Because only gravitational force is utilized, there is no risk of over pressuring fuel lines if a pump's internal or external pressure regulator fails. The fuel delivery assembly of the present invention does not require any wires, electronics, or computers to keep fuel tanks full.

The fuel delivery assembly of the present invention eliminates the need for personnel to enter "high pressure zone" restricted areas. During most conventional fracking operations, as well as other industrial applications involving high pressure pumping, a high pressure zone is designated. Access to said high pressure zone by personnel is limited or restricted during such pumping operations. The fuel delivery assembly of the present invention automatically keeps the fuel tanks filled to a predetermined level without requiring personnel to enter said restricted high pressure zone to add fuel to trucks or pumps.

Once the fracking operation has been completed, in order to disconnect the fuel delivery assembly, fuel flow will be shut off at the main central bulk fluid tank 250. All of the relatively small feeder lines will be disconnected from the main supply loop. Low pressure nitrogen or air will be blown around the main supply line loop and back into the central bulk fluid tank 250 in order to lessen the weight of fuel in the lines, as necessary. All of the remaining feeder lines will be stored with fuel in them, since said lines are all equipped with dry break connections. The dry break connections will then be disconnected from the adapter assemblies, and the fixture assemblies will be removed from the equipment; all of the component parts will be rolled up and packed up and stored in the supply boxes. The central bulk fluid tank 250 will be emptied of any additional fuel for transport. Thus, the tank 250 will be lowered, the stabilizing legs 252 will be lifted, and the entire assembly 200 will be moved and transported to the next desired location.

Figure 8:
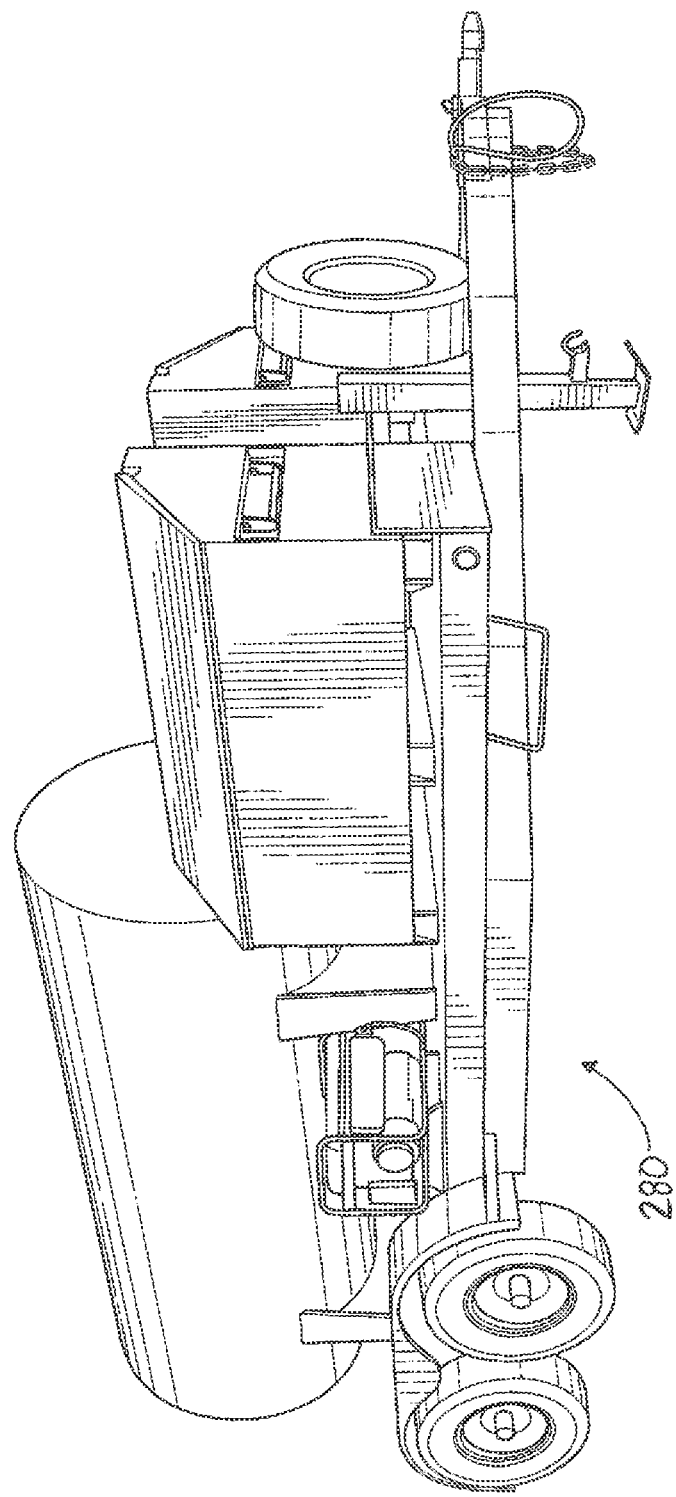
FIG. 8 depicts a side perspective view of a support trailer of the present invention.

FIG. 8 depicts a side perspective view of a support trailer 280 of the present invention. Support trailer 280 is able to provide relatively clear fuel for a variety of different tractors, or any other similar equipment, provide dyed fuel to a plurality of light plants, or provide any other similar means that are not part of the main frackinq operation.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. An apparatus for refueling at least one internal combustion engine comprising:
    a. a bulk storage tank containing fuel, wherein said bulk storage tank is adapted to be raised to a higher elevation than an inlet of a fuel tank of said at least one internal combustion engine;
    b. a conduit having a first end and a second end, wherein said first end is in fluid communication with said bulk storage tank and said second end is attached to said inlet of said fuel tank of said at least one internal combustion engine; and
    c. a float valve assembly operationally attached to said second end of said conduit and disposed in said fuel tank of said at least one internal combustion engine, wherein said float valve assembly is adapted to permit fuel to gravity feed from said bulk storage tank into said fuel tank through said conduit, but to block fuel flow from said conduit into said fuel tank when fuel in said fuel tank reaches a predetermined level, wherein said float valve assembly further comprises:

a. a sleeve member having a top, a fluid inlet, a length, an inner chamber and a bottom having an opening extending into said inner chamber;
b. a seat member defining an opening, wherein said seat member is disposed in said sleeve member between said fluid inlet and said inner chamber;
c. a ball disposed on said seat member to create a fluid pressure seal;
d. a substantially buoyant float member slidably disposed in said inner chamber; and
e. a linkage assembly disposed between said float member and said seat member, wherein said linkage assembly lifts said ball from said seat and breaks said fluid pressure seal when said float member reaches a predetermined position along the length of said sleeve member.

2. The apparatus of claim 1, further comprising at least one fluid powered cylinder adapted to selectively raise and lower said bulk storage tank.

3. The apparatus of claim 1, wherein said bulk storage tank is trailer mounted.

4. The apparatus of claim 1, wherein said at least one internal combustion engine comprises a fluid pump on a hydraulic fracturing location.

5. The apparatus of claim 1 wherein said float valve assembly is mounted to a cap adapted to fit on an inlet to said fuel tank.

6. The apparatus of claim 5, further comprising a swivel assembly adapted to position said float valve assembly in a substantially vertical position.

7. A method for delivering fuel to an internal combustion engine, comprising:
a. providing a bulk storage tank containing fuel;
b. installing a conduit from said bulk storage tank to a fuel tank of said internal combustion engine;
c. installing a float valve assembly disposed in said fuel tank and in fluid communication with an outlet of said conduit, said float valve assembly adapted to permit fuel to gravity feed from said bulk storage tank into said fuel tank through said conduit, but to block fuel flow from said conduit into said fuel tank when fuel in said fuel tank reaches a predetermined level.
d. raising said bulk storage tank to an elevation above said fuel tank; and
e. allowing fuel to gravity flow from said bulk storage tank through said conduits and into said fuel tank, wherein said float valve assembly further comprises:
  a. a sleeve member having a top, a fluid inlet, a length, an inner chamber and a bottom having an opening extending into said inner chamber;
  b. a seat member defining an opening, wherein said seat member is disposed in said sleeve member between said fluid inlet and said inner chamber;
  c. a ball disposed on said seat member to create a fluid pressure seal;
  d. a substantially buoyant float member slidably disposed in said inner chamber; and
  e. a linkage assembly disposed between said float member and said seat member, wherein said linkage assembly lifts said ball from said seat and breaks said fluid pressure seal when said float member reaches a predetermined position along the length of said sleeve member.

8. The method of claim 7, wherein raising said bulk storage tank to an elevation above said fuel tank further comprises raising said bulk storage tank using at least one fluid powered cylinder adapted to selectively raise and lower said bulk storage tank.

9. The method of claim 7, wherein said bulk storage tank is trailer mounted.

10. The method of claim 7, wherein said internal combustion engine comprises a fluid pump at a hydraulic fracturing location.

11. The method of claim 7, wherein said float valve assembly is mounted to a cap adapted to fit on an inlet of said fuel tank.

12. The method of claim 7, wherein said float valve assembly is coupled to a swivel assembly adapted to position said float valve assembly in a substantially vertical orientation within said fuel tank.

13. An apparatus for refueling at least one internal combustion engine comprising:
a. a bulk storage tank containing fuel, wherein said bulk storage tank is adapted to be raised to a higher elevation than an inlet of a fuel tank of said at least one internal combustion engine;
b. a conduit having a first end and a second end, wherein said first end is in fluid communication with said bulk storage tank and said second end is attached to said inlet of said fuel tank of said at least one internal combustion engine; and
c. a float valve assembly operationally attached to said second end of said conduit and disposed in said fuel tank of said at least one internal combustion engine, wherein said float valve assembly is adapted to permit fuel to gravity feed from said bulk storage tank into said fuel tank through said conduit, but to block fuel flow from said conduit into said fuel tank when fuel in said fuel tank reaches a predetermined level, wherein said float valve assembly further comprises:
  a. a sleeve member having a top, a fluid inlet, a length, and inner chamber and a bottom having an opening extending into said inner chamber;
  b. a seat member defining a first opening and a second opening, wherein said seat member is disposed in said sleeve member between said fluid inlet and said inner chamber;
  c. a first ball disposed on said first opening, wherein said first ball blocks fluid from flowing through said first opening into said inner chamber;
  d. a second ball disposed on said second opening, wherein said second ball blocks fluid from flowing through said second opening into said inner chamber; and
  e. a substantially buoyant float member slidably disposed in said inner chamber;
  f. a linkage assembly disposed between said float member and said seat member, wherein said linkage assembly further comprises:
    i. a first ball displacement arm adapted to lift said first ball from said first opening, thereby permitting fluid to flow through said first opening and into said inner chamber when said float member reaches a predetermined position along the length of said sleeve member; and
    ii. a second ball displacement arm adapted to lift said second ball from said second opening and permit fluid to flow through said second opening and into said inner chamber wherein said second ball displacement arm is shorter than said first ball displacement arm.

14. A method for delivering fuel to an internal combustion engine, comprising:
   a. providing a bulk storage tank containing fuel;
   b. installing a conduit from said bulk storage tank to a fuel tank of said internal combustion engine;
   c. installing a float valve assembly disposed in said fuel tank and in fluid communication with an outlet of said conduit, said float valve assembly adapted to permit fuel to gravity feed from said bulk storage tank into said fuel tank through said conduit, but to block fuel flow from said conduit into said fuel tank when fuel in said fuel tank reaches a predetermined level.
   d. raising said bulk storage tank to an elevation above said fuel tank; and
   e. allowing fuel to gravity flow from said bulk storage tank through said conduit and into said fuel tank, wherein said float valve assembly further comprises:
      a. a sleeve member having a top, a fluid inlet, a length, an inner chamber and a bottom having an opening extending into said inner chamber;
      b. a seat member defining a first opening and a second opening, wherein said seat member is disposed in said sleeve member between said fluid inlet and said inner chamber;
      c. a first ball disposed on said seat member to create a first fluid pressure seal;
      d. a second ball disposed on said seat member to create a second fluid pressure seal;
      e. a substantially buoyant float member slidably disposed in said inner chamber;
      f. a linkage assembly disposed between said float member and said seat member, wherein said linkage assembly further comprises:
         i. a first ball lifting arm adapted to lift said first ball and permit fluid flow through said first opening and into said inner chamber when said float member reaches a predetermined position along the length of said sleeve member; and
         ii. a second ball lifting arm adapted to lift said second ball and permit fluid flow through said second opening an into said inner chamber when said float member reaches a predetermined position along the length of said sleeve member, wherein said second ball lifting arm is shorter than said first ball lifting arm.

* * * * *